United States Patent [19]

Bradshaw et al.

[11] 4,008,627
[45] Feb. 22, 1977

[54] RACK AND PINION UNITS

[75] Inventors: Kenneth Bradshaw; James Ernest Buckingham, both of Bristol, England

[73] Assignee: Cam Gears Limited, Hitchin, England

[22] Filed: July 18, 1973

[21] Appl. No.: 380,259

[52] U.S. Cl. .................................. 74/498; 74/498
[51] Int. Cl.² .......................................... B62D 1/20
[58] Field of Search ............................. 74/498, 422

[56] References Cited
UNITED STATES PATENTS

| 1,332,161 | 2/1920 | Dahlen | 74/498 |
| 1,360,518 | 11/1920 | Funk | 74/498 |
| 3,505,898 | 8/1970 | Bradshaw | 74/498 |
| 3,777,589 | 12/1973 | Adams | 74/498 |

Primary Examiner—Leonard H. Gerin

[57] ABSTRACT

A rack and pinion steering gear includes a unitary, sealed housing of plastic material. The housing comprises at least two housing shells having bearing seats and the like integrally molded therein for mounting a rack bar and a pinion assembly in operative engagement. The shells also have passageways molded therein to add rigidity to the housing and to promote the flow of a lubricant along and about the rack bar.

19 Claims, 3 Drawing Figures

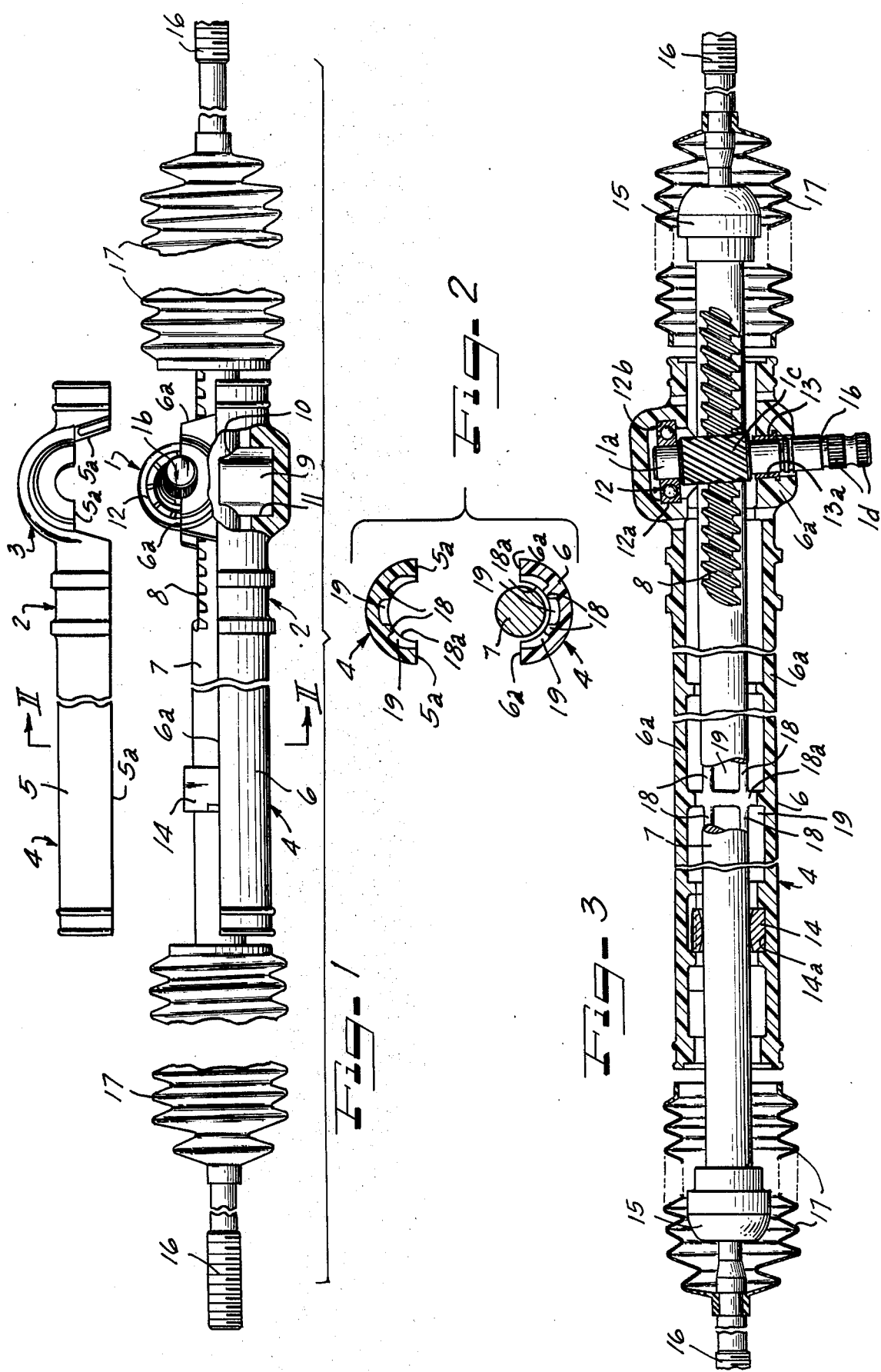

RACK AND PINION UNITS

BACKGROUND OF THE INVENTION

1. Field of the Invention

This invention relates to rack and pinion units for vehicle steering gears, and more particularly to rack and pinion units which are supported and enclosed in housings constructed of molded plastic shells having integrally molded supporting structure for the rack and pinion mechanism.

2. Description of the Prior Art

The Adams, U.S. Pat. No. 3,777,589, granted Dec. 1, 1973, assigned to Cam Gears Limited, is primarily concerned with the provision of a housing of engineering plastic material within which cooperating input and output components for a mechanical drive transmission system are mounted. One such system has a rack and pinion assembly for a vehicle steering gear.

SUMMARY OF THE INVENTION

It is an object of the present invention to provide a simple and economical rack and pinion structure whose operating components are protected from the deleterious effects of the elements and the structure is considered to be an improvement over the rack and pinion steering gear disclosed in the aforementioned British application.

According to the present invention, a rack and pinion unit for a vehicle steering gear comprises a rack bar cooperating with a pinion, both of which are mounted within a unitary housing constructed from engineering plastic material, as defined in the aforementioned British application, and in which the housing is an assembly comprising at least two pre-molded shell-like components which are assembled and secured about the pinion and rack bar so as to constitute a unitary housing.

More particularly, the present invention provides a rack and pinion unit for a vehicle steering gear which comprises a rack bar cooperating with the pinion, both of which are mounted within a unitary housing constructed of engineering plastic material (as hereinafter defined) and comprising a pinion casing (as hereinafter defined) from which extends a tubular rack bar casing which encloses the major part of the rack bar. The housing is an assembly comprising at least two pre-molded shell-like components each of which integrally incorporates a portion of the pinion casing and a portion of the rack bar casing. The components are assembled and secured once and for all around permanently the pinion and rack bar to constitute the unitary housing.

By the term "engineering plastics material" is meant a plastic material which is physically strong but not too rigid so that it has enough resiliency to absorb and dissipate the shock energy to which the unitary housing is submitted in use.

One example of a suitable parameter for such materials is a Young's modulus in the middle of $10^5$ to low $10^6$ lbs. per sq. inch (say in the range $3 \times 10^5$ to $2 \times 10^6$ lbs. per sq. inch). Other possible perameters are a tensile strength of (preferably) not less than 6,000 lbs. per sq. inch and an elongation at break preferably, but not essentially, not less than 5%. Further these properties should not alter unduly over a temperature range of at least −5° C to 35° C. Preferably, this temperature range should be as broad as possible, and a range in the order of −40° C to 100° C is desirable. If required the engineering plastic material of the housing may be reinforced with a filler material and a filler material of glass fiber is preferred.

It is to be emphasised however that the term engineering plastic material, is not exclusively limited to materials having the above properties. Examples of engineering plastic materials that comply with the above requirements are tabulated as follows:

| Material | Young's Modulus × $10^5$ lbs. per sq. in. | Tensile strength lbs. per sq. in. | Elongation at break |
|---|---|---|---|
| unfilled material | | | |
| Nylon | 3.5 | 9,500 | 60–100 |
| ABS | 3.5 | 6,500 | 5–60 |
| Polyacetal | 5.0 | 10,000 | 25–75 |
| Reinforced with glass fiber filler | | | |
| ADS | 7.0 | 8,000 | 2.5–3 |
| Polypropylene | 7.0 | 7,000 | 2.0–3.6 |
| Nylon 66 | 10.0 | 20,000 | 5.0–10 |
| Polyacetal | 10.0 | 9,000 | 2.0–7 |

The percentage elongation at break of the glass fiber reinforced materials depends to an appreciable extent on the amount of glass fiber present so that it is, in general terms, practical to control the elongation at break at the desired value by adjusting the glass fiber content.

The materials listed are thermoplastic so that injection moulding is a convenient method of making the shell-like components of the housing.

Although it is often accepted that plastic materials in general may be substituted for metal in certain branches of engineering, it is also accepted that the uncritical substitution is only practicable for components which are to be subjected to medium or heavy loads (other than brushings, tires, drive belts and the like, as are well known in the art). This is primarily due to the Young's modulus of the general run of plastic materials as compared with metals.

The rack and pinion unit for vehicle steering gear is subject to medium and often heavy loads in use and these loads are often entirely or largely borne by the housing. A unitary housing made of engineering plastic material, as herein defined, provides a firm mounting for the interengaging internal elements of the steering gear. Also, it provides considerably improved resistance to shock loading. Such a unitary housing in accordance with the invention further provides a damping effect to decrease rapidly the vibration in comparison with conventional metal housings of rack and pinion units.

The term "pinion casing" is hereinafter used to designate that portion of the housing in which is located both the rotatably mounted pinion and means on the side of the rack bar remote from its position of engagement with the pinion for supporting the rack bar with its rack in engagement with the pinion. Generally, the means in the pinion casing for supporting the rack bar comprises a yoke or like member which can be resiliently biased or spring loaded into engagement with the rack bar and is usually appropriately recessed or shaped in conformity to the shape of the rack bar to slidably receive the rack bar in a substantially complementary manner.

According to the present invention, the housing is preferably formed of two shell-like components which are appropriately molded to provide recesses and seatings as necessary for the pinion, or more usually for bearings in which the pinion is rotatably mounted, the rack bar and the means for supporting the rack bar in engagement with the pinion. The support means is generally in the form of, and will hereinafter be considered as, a yoke member. In order to facilitate assembly, the two pre-molded components are conveniently arranged to have a separation line which extends through the length of the housing in the longitudinal direction of the rack bar. This separation line, at least in part, is preferably shaped in the region of the pinion casing to receive a pinion shaft which extends from the housing and is intended to be coupled to a rotatable steering component on the vehicle in which the gear is fitted. The latter feature may necessitate the extension of the separation line in a dog-leg configuration.

In a preferred construction, in which the housing comprises a tubular rack bar casing, the rack bar casing may be provided with an appropriate seating in which is located a bushing for supporting the rack bar in sliding relationship, such bushing being located in the rack bar casing at a position remote from the pinion.

To construct a rack and pinion unit in accordance with the present invention, two or more shell-like components are preferably pre-molded so that they can be assembled to form the housing by abutment on appropriate separation lines. At least one of these components is preferably shaped to provide seatings for receiving the yoke member and the bushings which are operatively associated with the pinion and with the rack bar. These aforementioned internal components are arranged to cooperate with each other in a conventional manner and thereafter the pre-molded component or components are assembled around the rack bar and pinion and are permanently secured together. The pre-molded components may be secured together over the abutting faces of the components at the separation lines, for example, by heat welding in the case of thermoplastic material for the housing, or by a suitable adhesive or bonding agent (especially for a thermosetting or cold setting resin plastic material for the housing).

A considerable advantage is afforded by the present invention since the shell-like components are pre-molded so that the necessary recesses and seatings for the internal elements of the rack and pinion unit can be accurately molded in, thereby alleviating machining requirements for the housing and also the requirement for fixing plugs or other retaining means for the internal elements. The two or more shell-like components of the housing for each rack and pinion unit may conveniently be injection molded simultaneously in a common tool, although when formed of a thermosetting resin plastic material such components are conveniently press molded from a sheet of plastic material.

According to the invention, there is also provided a new method of constructing a rack and pinion unit for a vehicle steering gear which comprises a rack bar cooperating with the pinion, both of which are enclosed within a unitary housing. This unique method comprises molding at least two shell-like components from engineering plastic material, locating the rack bar and pinion in appropriate seatings and in cooperative engagement with each other in one of the shell-like components, assembling the other shell-like component or components around the cooperating rack bar and pinion, and securing the shell-like components together permanently to form the unitary housing.

The present invention further includes a rack and pinion unit when constructed in accordance with the method of the present invention.

Still further according to the present invention there is provided a vehicle steering gear which incorporates a rack and pinion unit constructed in accordance with the present invention.

BRIEF DESCRIPTION OF THE DRAWINGS

Other objects, features and advantages of the invention, its organization, construction and operation will be best understood from the following detailed description of an exemplary embodiment of the invention, taken in conjunction with the accompanying drawing, on which:

FIG. 1 is a side illustration of a rack and pinion unit in which the housing is formed of two pre-molded components of engineering plastic material, and in which in partially exploded manner the housing is shown prior to assembly of the two components into a unitary structure;

FIG. 2 is a sectional view of the rack and pinion unit of FIG. 1 taken generally along the line II—II of FIG. 1; and FIG. 3 is a plan view of the rack and pinion unit illustrated in FIG. 1 shown with the upper pre-molded component of the housing removed.

DESCRIPTION OF THE PREFERRED EMBODIMENT

Referring to the drawing, a rack and pinion unit comprises a pinion assembly 1 having an integral pinion shaft defined by its ends 1a and 1b. The pinion assembly 1 is rotatably mounted in a housing shown generally at 2 which comprises a pinion casing 3 from which extends a tubular rack bar casing 4.

The housing 2 is formed as an assembly from two shell-like components, shown generally at 5 and 6, each of which is made, for example, by injection molding from an engineering plastic material. The plastic material may be, for example, an acetal copolymer (such as that manufactured by Imperial Chemical Industries Limited and currently sold under the Trade Mark "Kemetal"). The housing 2 is assembled by securing the components 5 and 6 together along longitudinally extending separation lines (surfaces) 5a and 6a, respectively, as will be described in greater detail below.

A generally cylindrical rack bar 7 extends longitudinally through the housing 2 and includes a rack 8 which cooperates with a pinion 1c, carried by the pinion shaft, in a known manner so that upon rotation of the pinion 1c, the rack bar 7 is moved longitudinally through the pinion casing 3 and the tubular rack bar casing 4 of the housing 2. The pinion casing 3 provides location for both the rotatably mounted pinion and a yoke member 9 which is positioned on the side of the rack bar 7 remote from its position of engagement with the pinion 1c and serves to support the rack bar 7 with the rack 8 in engagement with the pinion 1c. The yoke member 9 has a part cylindrical recess 10 which slidably receives the rack bar 7 and is mounted in a complementary seating 11 molded in the wall of a portion of the shell-like component 6 which forms part of the pinion casing 3.

The pinion 1c is rotatably mounted in the pinion casing 3 in a ball bearing 12 located on the pinion shaft end 1a and a plane bearing bushing 13 located on the pinon shaft adjacent the end 1b. The shaft end 1b may be adapted for coupling to an operator controlled steering mechanism, such as by a spline arrangement 1d or the like. The shell-like component 6 is molded to provide appropriate seatings 13a, 12b in the pinion casing 3 for receiving the bearing bushing 13 and the outer race 12a of the ball bearing 12, respectively (see FIG. 3).

A bearing bushing 14 is provided to slidably receive and support the rack bar 7 in the rack bar casing 4 at a position remote from the pinion 1c. The bearing bushing 14 is located in a complementary seating 14a molded in the shell-like component 6, and a complementary seating may also be provided in the shell-like component 5.

To construct the rack and pinion unit, the yoke member 9 is first located in the seating 11 and thereafter the rack bar 7 carrying its bearing bushing 14 is laid into the shell-like component 6 so that the rack bar 7 engages in the recess 10 of the yoke member and the bushing 14 is located in its complementary seat 14a in the shell-like component 6. The pinion assembly 1 carrying its bearings 12 and 13 is now positioned so that the pinion 1c engages the rack 8 and the just-mentioned bearings are located within their respective molded seats in the pinion casing of the shell-like component 6. It will be noted that for the purpose of locating the pinion with the shaft end 1b extending from the pinion casing 3 so that it can be coupled to a rotatable steering component of a vehicle in which the gear is fitted, the separation line 6a (and similarly the complementary separation line 5a) is dog-legged in the region of the pinion casing and is shaped to appropriately receive the shaft end 1b. The shell-like component 5 is now assembled over the rack bar 7 and the pinion assembly 1 to be positioned complementary to the shell-like component 6 with the faces which define the separation lines 5a and 6a in abutment. The two components 5 and 6 are secured together by appropriate heat welding along the abutting faces at the separation line to complete the unitary housing.

In an alternative method of assembling the unitary housing, the two components 5 and 6 are secured together by applying an appropriate adhesive or bonding agent, such as a phenolic or polyester resin, along the intended abutting faces at the split lines, and then pressing these faces together until the resin has set.

Preferably, the interior of the shell-like component 5 is appropriately molded to provide seating parts for the bearing bushing 14, the bearing bushing 13 and the outer race 12a of the ball bearing 12 in a similar manner to that illustrated for the shell-like component 6. Once the two shell-like components 5, 6 have been secured together, it is not intended that they should be separated to permit servicing of the rack bar and pinion or of the respective bearings. In other words, the two shell-like components 5, 6 are permanently secured one to the other. However, should any such servicing be necessary, then the housing may be cut open and if any of the internal elements are still serviceable these components may be incorporated within new shell-like components, the latter component being relatively inexpensive to replace.

For use of the unit in a vehicle steering gear, the ends of the rack bar 7 are articulately connected through couplings 15 to the rods 16, the latter intended to be coupled to steerable road wheels of the vehicle in a known manner. Flexible bellows 17 extend in a sealed relationship between each tie rod 16 and the adjacent end of the housing 2 to which they are respectively secured by clips (not shown). The bellows 17 and the housing 2 together form a sealed chamber which may contain an appropriate lubricant. It will be noted from FIG. 2 that the shell-like components 5 and 6 are provided with longitudinally extending and transversely spaced internal ribs 18 and transversely extending and longitudinally spaced internal ribs 18a in the rack bar casing 4. These ribs 18 and 18a provide a convenient means of reinforcing the rack bar casing and provide longitudinal channels 19 for facilitating the flow of lubricant through the housing.

Although we have described our invention by reference to an exemplary embodiment thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

We claim:

1. A rack and pinion steering gear comprising:
   a rack bar carrying a rack;
   pinion means including
      a shaft,
      a pinion on said shaft, and bearing means for mounting said shaft for rotation; and a unitary housing including at least two mating housing shells enclosing said rack bar, said pinion and said bearing means, each of said shells including first support means slidably mounting said rack bar,
      second support means fixedly mounting said pinion assembly with said pinion operatively engaging said rack, and
      securing means permanently securing said shells together in a fixed, mated relationship.

2. A rack and pinion steering gear according to claim 1 wherein said first support means comprises:
   a bearing bushing receiving said rack bar in sliding engagement; and a bearing seat molded in said housing shells for mounting said bearing bushing at a point remote from the engagement of said rack with said pinion.

3. A rack and pinion steering gear according to claim 1, comprising:
   a yoke mounted in one of said shells opposite the engagement of said rack and said pinion for holding said rack against said pinion, said yoke including a surface shaped complemental to the adjacent surface of said rack bar and receiving said rack bar in sliding engagement.

4. A rack and pinion steering gear according to claim 1, wherein said rack bar has a generally circular cross section.

5. A rack and pinion steering gear according to claim 1, wherein said securing means includes a bonding material.

6. A rack and pinion steering gear according to claim 1, wherein said shells include a plastic material.

7. A rack and pinion steering gear according to claim 6, wherein said shells include an acetal co-polymer.

8. A rack and pinion steering gear according to claim 1, wherein said shells include a thermoplastic material and said securing means includes heat welded adjacent portions of said shells.

9. A rack and pinion steering gear according to claim 1, wherein said shells include a thermosetting plastic material and said securing means includes a bonding agent.

10. A rack and pinion steering gear according to claim 1, comprising means defining integrally formed channels in each of said shells which direct the flow of a lubricant along said rack bar.

11. A rack and pinion steering gear according to claim 10, wherein said channel defining means includes longitudinally and transversely extending ribs projecting inwardly within said shells to define said channels and strengthen said shells.

12. A rack and pinion steering gear according to claim 10, comprising:
means articulately coupled to each end of said rack bar for connecting said rack bar to steerable wheels of a vehicle; and flexible sealing means at each end of said housing connecting the respective articulately coupled means and said housing in a fluid sealed relationship.

13. A rack and pinion steering gear comprising: a rack bar carrying a rack and having a circular cross section; a pinion assembly including,
a shaft;
bearing means mounting said shaft for rotation, and a pinion mounted on said shaft for rotation therewith; a unitary housing including
at least two mating plastic housing shells together enclosing said rack bar, said bearing means and said pinion,
each of said housing shells including
first support means mounting said rack bar for longitudinal movement including a rack bar bearing, and
a rack bar bearing seat integrally molded in said housing shells,
second support means fixedly mounting said pinion assembly with said pinion operatively engaging said rack;
a yoke also supporting said rack bar opposite its engagement with said pinion, said yoke having an arcuate surface conforming to the circular cross section of said rack bar and receiving said rack bar in sliding engagement; means biasing said yoke toward said rack bar, and means permanently securing said shells together in a fixed mated relationship.

14. A rack and pinion unit for a vehicle steering gear which comprises a rack bar carrying a rack, a pinion having teeth meshed with said rack and a shaft extending from the teeth, bearings rotatably supporting said pinion, bearings slidably supporting said rack bar, a longitudinally split housing composed of at least two preformed shell-like components embracing said rack bar and pinion and each providing recesses and seats locating and retaining said pinion bearings and said rack bar bearings, and said shell-like components being secured together along the length thereof to form a unitary housing for the rack bar and pinion.

15. The rack and pinion unit of claim 14 wherein the unitary housing has a pinion casing portion and a tubular rack bar casing portion extending from the pinion casing portion to enclose the major part of the length of the rack bar and wherein each of said shell-like components integrally incorporate a part of the pinion casing portion and a part of the rack bar casing portion.

16. The rack and pinion unit of claim 15 in which the separation line is shaped to receive the pinion shaft and the pinion shaft extends from the housing.

17. The rack and pinion unit of claim 14 wherein the unitary housing comprises two shell-like components having a separation line which extends throughout the length of the housing in the longitudinal direction of the rack bar.

18. The rack and pinion unit of claim 14 wherein the preformed shell-like components of the unitary housing are made from engineering plastics material having a Young's modulus of about $3 \times 10^5$ to $2 \times 10^6$ pounds per square inch, a tensile strength of not less than about 6,000 pounds per square inch, and an elongation at break of not less than about 5 percent.

19. The rack and pinion unit of claim 18 wherein the engineering plastics material is substantially stable over a temperature range of at least −5° C. to at least 35° C.

* * * * *